March 11, 1952     G. H. AMONSEN     2,589,032
POWER TRANSMISSION MECHANISM
Filed Feb. 26, 1949     4 Sheets-Sheet 1
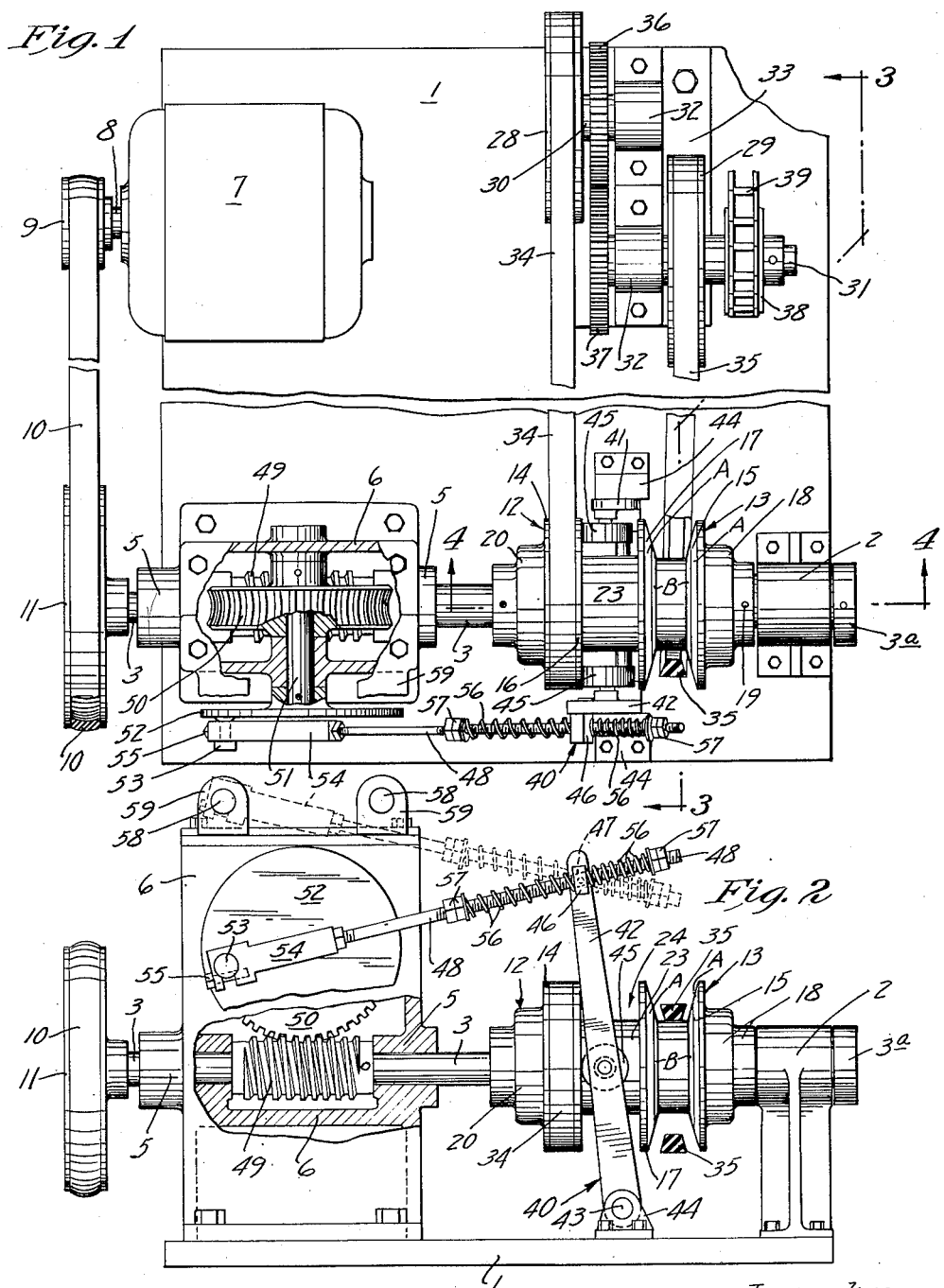
Inventor
George H. Amonsen
By his Attorneys
Merchant & Merchant March 11, 1952 — G. H. AMONSEN — 2,589,032
POWER TRANSMISSION MECHANISM
Filed Feb. 26, 1949 — 4 Sheets-Sheet 2

Inventor
George H. Amonsen
By his Attorneys
Merchant & Merchant

March 11, 1952  G. H. AMONSEN  2,589,032
POWER TRANSMISSION MECHANISM
Filed Feb. 26, 1949  4 Sheets-Sheet 3

Inventor
George H. Amonsen
By his Attorneys
Merchant + Merchant

March 11, 1952 G. H. AMONSEN 2,589,032
POWER TRANSMISSION MECHANISM
Filed Feb. 26, 1949 4 Sheets-Sheet 4

Inventor
George H. Amonsen
By his Attorneys
Merchant & Merchant

Patented Mar. 11, 1952

2,589,032

UNITED STATES PATENT OFFICE 2,589,032

POWER TRANSMISSION MECHANISM

George H. Amonsen, Minneapolis, Minn.

Application February 26, 1949, Serial No. 78,647

14 Claims. (Cl. 74—220)

My present invention relates to automatically reversing power transmission mechanism for use in driving commercial washing machines, churns, or the like, where a periodic automatic reversal of motion is required.

An important object of my invention is the provision of such a mechanism which utilizes the driving belts and pulleys associated therewith as cooperating clutching elements.

Another object of my invention is the provision of means whereby a device driven through my novel transmission may be selectively driven in either forward or reversed directions or may be automatically driven alternately in opposite directions.

A further object of my invention is the provision of such a mechanism, which is simple and rugged in construction, inexpensive to produce, and efficient and durable in use.

The above and still further objects and advantages will become apparent from the following specification, attached drawings and appended claims.

Referring to the drawings in which like characters indicate like parts throughout the several views:

Fig. 1 is a view in plan with some parts being broken away, showing a preferred embodiment of my novel transmission mechanism operatively associated with a driving motor and connections, whereby to drive a power operated device, not shown;

Fig. 2 is a view in front elevation, some parts being broken away;

Figure 3:
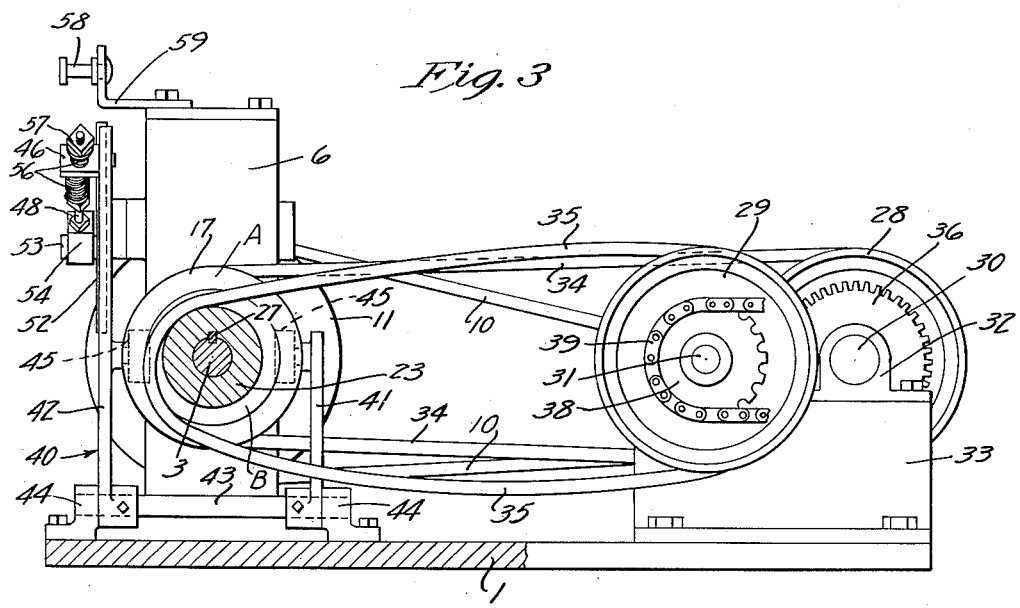
Fig. 3 is a view partly in side elevation and partly in section, taken substantially on the line 3—3 of Fig. 1.

Referring more particularly to the structure of Figs. 1 to 4, inclusive, the numeral 1 indicates a base to which is secured a bearing bracket 2. One end of a primary shaft 3 is journalled for rotation in the bearing bracket 2 through the medium of anti-friction bearings 4; and adjacent its other end the shaft 3 passes through and is journalled in bearing bosses 5 of a gear box 6, which in turn is secured fast to the base 1. The primary shaft 3 is adapted to be driven by a motor 7 having a shaft 8 to which is rigidly secured a pulley 9. A belt 10 runs over the pulley 9 and another pulley 11 fast on the primary shaft 3 adjacent the gear box 6 (see Figs. 1 and 2).

A pair of axially-spaced expansion pulleys 12 and 13 are mounted on the primary shaft 3 for rotation therewith and comprise axially stationary pulley flanges 14 and 15 and axially movable pulley flanges 16 and 17, respectively. The pulley flanges 14 to 17, inclusive, are provided with sloping faces adapted to engage the opposite sides of a pair of V belts for a purpose which will hereinafter be described. The pulley flange 13 is provided with a diametrically-reduced hub portion 18 which is secured to the primary shaft 3 by means of a pin 19. The pulley flange 12 is likewise provided with a diametrically-reduced hub portion 20 and is adjustably secured to the shaft 3 by means of a key 21 and a set screw 22 (see Fig. 4).

The pulley flanges 16 and 17 are joined by an elongated hub 23 to form a circumferential channel 24. As shown, the flanges 16 and 17 and the hub 23 are integrally formed and the opposite ends of the hub 23 are adapted to move axially within recesses 25 and 26 in the hubs 18 and 20 of their respective stationary pulley flanges 14 and 15. The hub 23 is free for axial sliding movements on the primary shaft 3 but is held against rotation with respect thereto by means of a sliding key 27. A collar 3a is pinned or otherwise secured to the extreme end of the primary shaft 3 and cooperates with the hub 18 and the bearings 4 in the bracket 2 to prevent axial movements of the shaft 3.

A pair of pulleys 28 and 29 are mounted fast on a pair of diametrically-spaced shafts 30 and 31, respectively. These shafts are journalled in bearings 32 on a suitable support 33, which is bolted or otherwise secured to the base 1 in spaced relation to the primary shaft 3. It will be seen, particularly by reference to Fig. 1, that the pulleys 28 and 29 are in cooperative alignment with the expansion pulleys 12 and 13, respectively. The expansion pulley 12 and pulley 28 are connected by an endless belt 34, and the expansion pulley 13 and pulley 29 are similarly connected by an endless belt 35. The belts 34 and 35 are preferably of the type commonly known as V belts and may be made from leather, rubber impregnated fiber, or the like. The belts 34 and 35 are of such length, and the distances between the expansion pulleys 12 and 13 and their respective cooperating other pulleys 28 and 29 are such that, when either of the expansion pulleys is in an axially-expanded condition, the belt running thereover will not be engaged by the expansion pulley flanges and will be allowed to idle or run freely over its associated expansion pulley. However, when either expansion pulley is moved to its axially contracted position, the belt running thereover will be engaged for frictional driving movements by the expansion pulley flanges associated therewith.

A spur gear 36 fast on the shaft 30 has meshing engagement with a similar gear 37 fast on the shaft 31 whereby to cause the pulleys 28 and 29 to rotate in opposite directions. The shaft 31 is herein shown as being a power output shaft and is provided with a sprocket 38 over which runs a driving chain 39. The chain 39 may be operatively coupled to another sprocket on a power driven device such as a washing machine drum or a churn not shown.

The arrangement of the expansion pulleys 12 and 13 is such that when one thereof is expanded, the other thereof is contracted. This arrangement provides driving engagement between but one expansion pulley and its associated belt at any given time. As an example, when the expansion pulleys 12 and 13 are in the position shown in Figs. 1, 2, and 4, the belt 34 is in driving engagement with the expansion pulley 12 and its cooperatively-aligned pulley 28. The belt 35, being entirely disengaged from the flanges of the expansion pulley 13, will not be driven thereby. With respect to Fig. 3, a clockwise rotation of the primary shaft will impart a clockwise rotation to the pulley 28 and, through the reversing gears 36 and 37, a counter-clockwise rotation to the output shaft 31.

Figure 4:
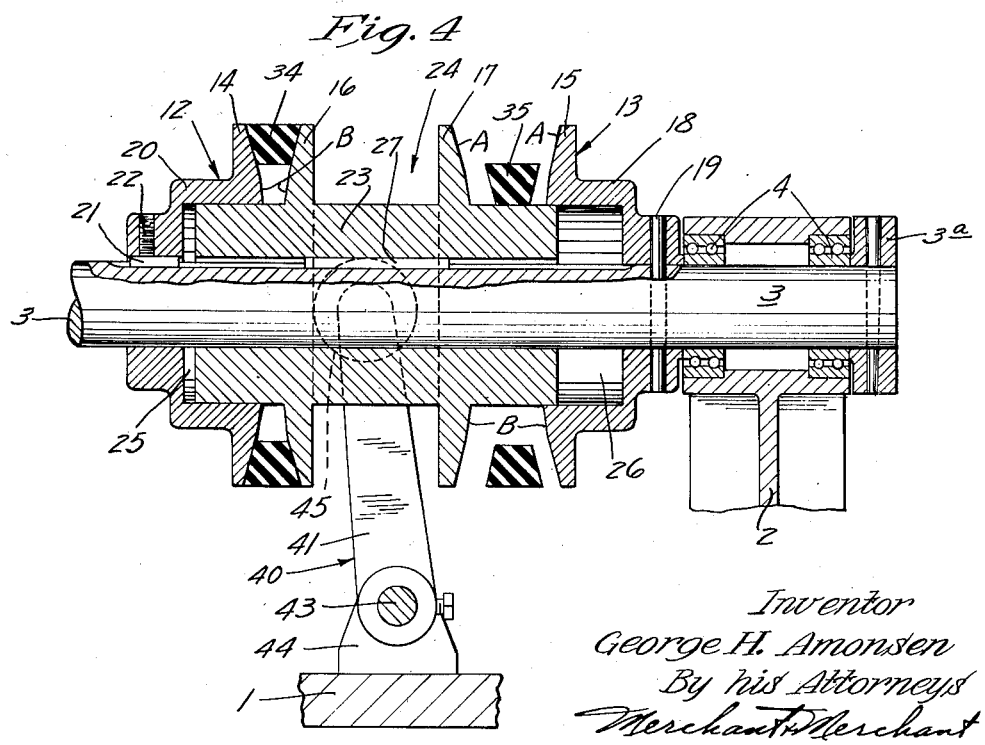
Fig. 4 is an enlarged fragmentary detail in section, taken on the line 4—4 of Fig. 1.
Figure 5:
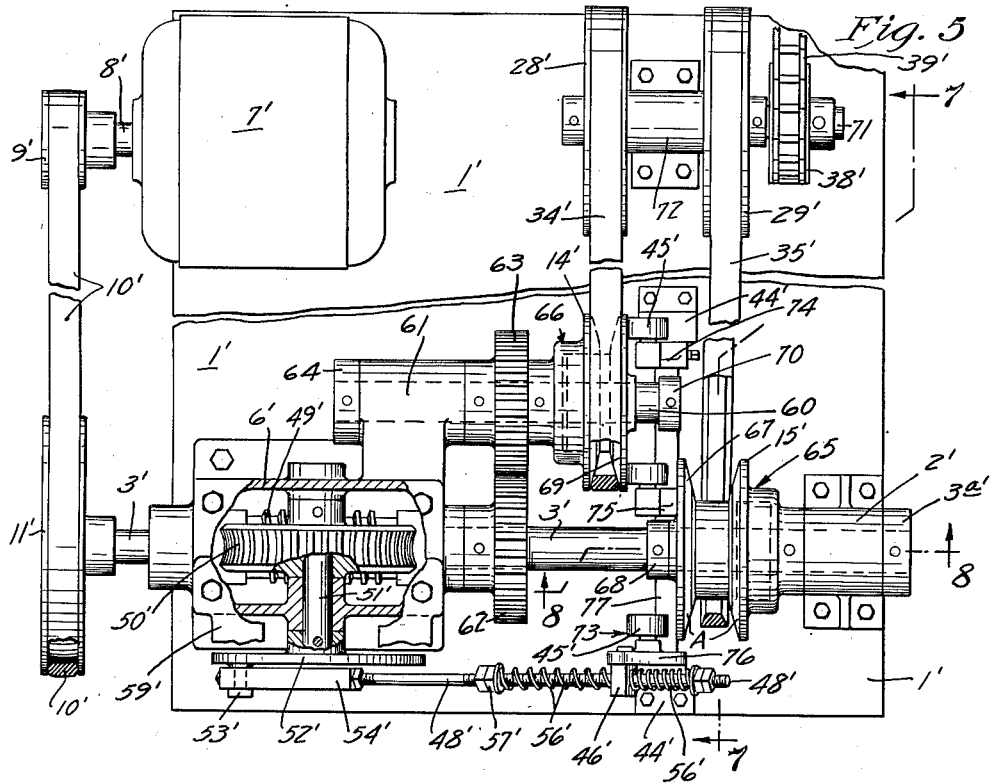
Fig. 5 is a view corresponding to Fig. 1, but showing a modified form of my invention, some parts being broken away and some parts shown in section.
Figure 6:
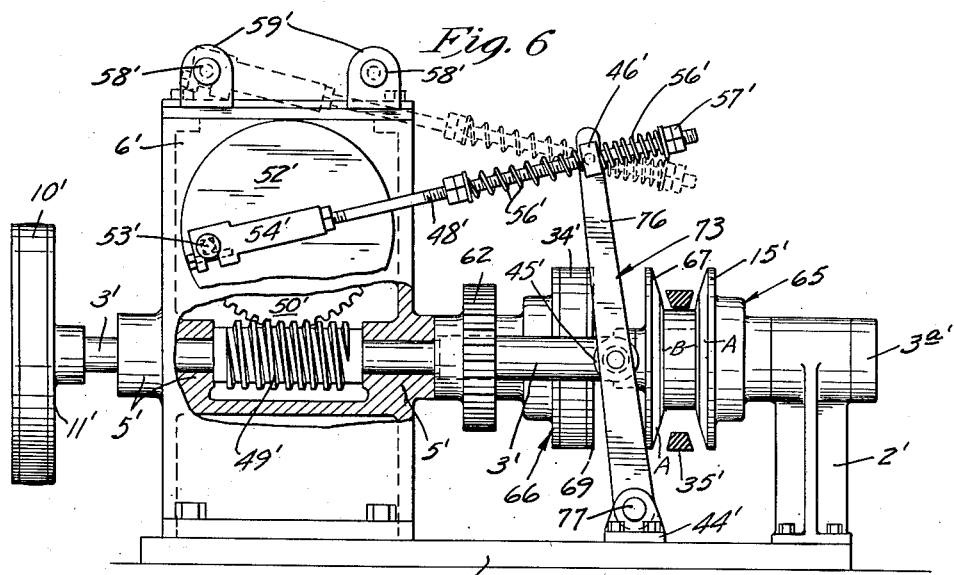
Fig. 6 is a front elevation of the mechanism shown in Fig. 5 with some parts being broken away.
Figure 7:
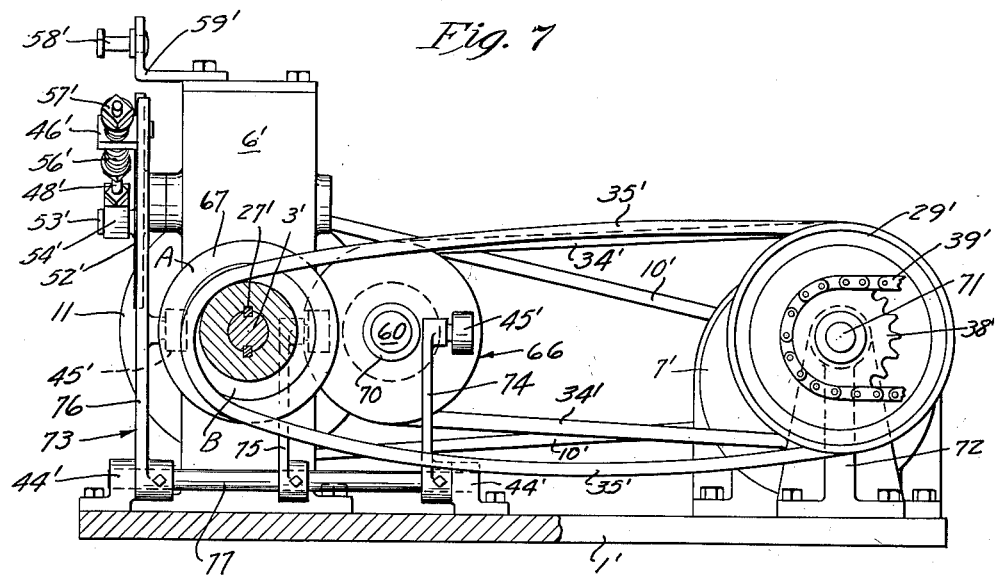
Fig. 7 is a view partly in side elevation and partly in section, taken substantially on the line 7—7 of Fig. 5.
Figure 8:
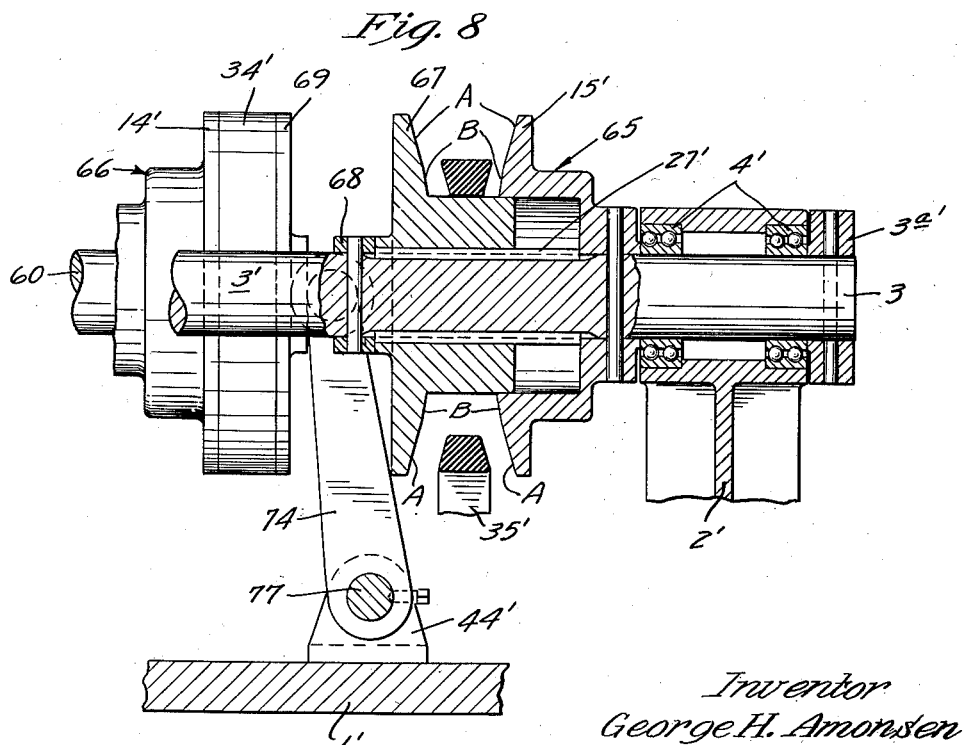
Fig. 8 is an enlarged fragmentary detail in section, taken on the line 8—8 of Fig. 5.

Axial movements of the hub 23 from the left to the right, with respect to Figs. 1, 2 and 4, will expand the pulley 12 and contract the pulley 13. The belt 34 will thus be freed from engagement with the flanges 14 and 16, and the belt 35 will be frictionally engaged and driven by the flanges 15 and 17. Thus, with respect to Fig. 3, clockwise rotation of the primary shaft 3 will cause the output shaft 31 to be also rotated in a clockwise direction while the belt 34 idles over the expanded pulley 12 in a reverse direction.

I provide means for shifting the movable portions of the expansion pulleys 12 and 13, in the nature of a shifter fork 40 comprising a shifter arm 41 and a shifter lever 42, each having its lower end fast on a rock shaft 43, which is journalled in bearings 44 secured to the base 1. A pair of rollers 45 are journalled, one to the upper end of the shifter arm 41 and one to the intermediate portion of the shifter lever 42. The rollers 45 are disposed at a level with the axis of the primary shaft 3 and at diametrically opposite sides thereof within the channel 24. A block 46 is journalled to the upper end of the shifter lever 42 and is provided with a transversely extending hole 47 in which is slidably mounted a pitman arm 48.

Mounted fast on the primary shaft 3 within the gear housing 6 is a worm 49 which has meshing engagement with a worm gear 50 fast on a shaft 51 journalled in the gear housing 6. The shaft 51 extends outwardly of the gear housing 6 and has fast on its outer end a crank in the nature of a disc 52 and a crank pin 53 secured thereto. The pitman arm 48 is provided with a bifurcated end 54 that fits over the crank pin 53 and may be rotatably secured thereto by means of a bolt or the like 55. A pair of coil compression springs 56 encompass the pitman arm 48, one on each side of the block 46, and impart opposing normally equal bias thereto. The extent of bias produced by the springs 56 is determined by adjustment of washer-equipped adjusting nuts 57, which are threaded on the pitman arm 48. It will be noted that the longitudinal travel of the pitman arm 48 is substantially greater than the amount necessary to shift the hub 23 from one extreme position to the other. When the limit of travel of the shifter lever 42 is reached in either direction, added motion of the pitman arm 48 results in compression of one or the other of the springs 56. The springs 56 serve to cushion the engagement of the belt by the flanges of the expansion pulleys and prevent the belts from being pressed too tightly between the pulley flanges when engaged thereby.

Rotation of the primary shaft 3 will rotate the disc 52 and cause reciprocation of the pitman arm 48. This reciprocation is transferred to the movable members of the expansion pulleys 12 and 13, so that the endless belts 34 and 35 are alternately frictionally engaged by their respective expansion pulleys 12 and 13. This alternate engagement results in a periodic reversal of rotation of the output shaft 31 and mechanism driven thereby.

For driving the output shaft 31 constantly in a selected direction, I provide a pair of stationary holding pins 58 on a bracket 59 secured to the gear housing 6. The pins 58 are spaced apart substantially equal to the diametrical travel of the crank pin 53 and similar in construction to said crank pin. The bifurcated end 54 of the pitman arm 48 may be easily and quickly removed from the crank pin 53 by merely removing the bolt 55 and thereafter secured to either of the holding pins 58 according to the direction of rotation desired in the output shaft 31. Hence, when the pitman arm 48 is disposed as shown by dotted lines in Fig. 2, the belt 34 is continuously engaged by the expansion pulley 12 for travel in one direction, and the belt 35 continuously idles over the expansion pulley 13 in a reverse direction.

In the modified form of my invention illustrated in Figs. 5 to 8, inclusive, parts identical to those shown in Figs. 1 to 4, inclusive, bear the same numbers with prime marks added. In this structure, I provide, in addition to the primary shaft 3', a counter shaft 60 journalled in a bearing bracket 61 on a gear housing 6'. A pair of intermeshing gears 62 and 63 are fast on the primary shaft 3' and counter shaft 60, respectively, whereby to continuously rotate the counter shaft 60 in a reverse direction with respect to the direction of rotation of the primary shaft 3'. The counter shaft 60 is held against axial movements by substantial abutting engagement of the gear 63 with one end of the bearing bracket 61 and a collar 64 secured to the counter shaft 60 adjacent the other end of the bracket 61.

A pair of expansion pulleys 65 and 66 are respectively carried by the shafts 3' and 60 and, as shown, are in axially spaced radially overlapping relation, one with respect to the other. The expansion pulley 65 comprises an axially stationary pulley flange 15' and an axially movable pulley flange 67. A stop collar 68, secured to the primary shaft 3', limits axial movement of the pulley flange 67 in one direction. The expansion pulley 66 comprises an axially stationary pulley flange 14' and an axially movable pulley flange 69. A stop collar 70 secured to the counter shaft 60 limits axial movement of the pulley flange 69 in one direction.

A power output shaft 71 is journalled in spaced relation to the shafts 3' and 60 in a bearing bracket 72 secured to the base 1'. Pulleys 28' and 29' are secured to the shaft 71 adjacent either end of the bearing bracket 72 and in cooperative alignment with the expansion pulleys 66 and 65 respectively. A driving sprocket 38' is secured to the output shaft 71, and a driving chain 39' is adapted to drive a power operated device, not shown. The endless belt 34' runs over the expansion pulley 66 and the output pulley 28'; and the belt 35' runs over the expansion pulley 65 and the output pulley 29'.

Means for shifting the movable pulley flanges 67 and 69 comprises a shifter fork, indicated in its entirety by the numeral 73, a pitman arm 48' connected thereto, and to a crank pin 53' on a disc 52', which is driven from the primary shaft 3' through a worm 49' and a worm gear 50'. The shifter fork 73 includes shifter arms 74 and 75 and a shifter lever 76, all of which are secured fast at their lower end to a rock shaft 77 journalled in bearings 44' bolted or otherwise secured to the base 1'. Shifter rollers 45' are journalled to the upper ends of the shifter arms 74 and 75 and to the intermediate portion of the shifter lever 76 and are positioned to engage the adjacent pulley flanges 67 and 69. The arms 74 and lever 76 are so positioned that the rollers 45' thereon move only against the pulley flanges 69 and 67, respectively; whereas the roller-equipped arm 75 is so positioned that the roller 45' thereon may move to engage the radially overlapping portions of the pulley flanges 67 and 69.

It is important to note that the pulley flanges 13 and 14, 16 and 17, 14' and 15' and 67 and 69 have opposed sloping belt-engaging surfaces A adjacent the peripheral portions thereof and other opposed sloping surfaces B extending radially inwardly from the surfaces A to the bottoms of the grooves formed by the flanges and their hubs. The opposing surfaces A form an angle which corresponds to the angle of a V-belt running therebetween, whereas the angle between opposed surfaces B is more acute. In fact, the angles formed by the opposed surfaces A measures substantially 30° of circular arc, and I provide an included angle between the opposed surfaces B of approximately 20° of circular arc. This smaller angle permits the cooperating flanges to approach one another to a greater extent than would be possible if the surfaces A extended to the bottom of the groove, and obviates the necessity of providing radial slots in opposing flanges for the purpose of intermeshing the same. Further, the reduced angle provides a wider separation at the bottom of the V groove with less axial separating movement of opposing flanges.

The angularity of opposing surfaces B is sufficient to urge the cooperating belts radially outwardly toward the surfaces A when the flanges are moved to a pulley-contracted position and during rotation thereof.

It is apparent from the foregoing that the expansion pulleys and endless belts cooperate to provide combining clutching and power transfer elements and eliminate any need for a separate driving or reversing clutch.

My invention has been thoroughly tested and found to be entirely satisfactory in accomplishing the desired results.

What I claim is:

1. Power transmission mechanism comprising a pair of expansion pulleys, a pair of other pulleys in spaced co-operatively aligned relation to said expansion pulleys, intermeshing reversing gears driving one of the pulleys of one of said pairs in a reverse direction to the second pulley of the same pair, a pair of endless belts, one each running over one of said expansion pulleys and its co-operatively aligned other pulley, means for manipulating said expansion pulleys to selectively and singularly bring the same into frictional driving engagement with their respective belts, said last named means including means for cushioning and timing the operation of the expansion pulleys in relation to each other and in their driving of the belts.

2. A power transmission mechanism comprising a primary shaft, bearings journalling said shaft, a second shaft and a power take-off shaft journalled in spaced relation to each other and to said primary shaft, intermeshing reversing gears on said second shaft and power take-off shaft, an axially spaced pair of expansible pulleys mounted on said primary shaft and each having a relatively fixed member and an axially movable member, a pair of other pulleys one each on said second shaft and said power take-off shaft in co-operative alignment with one each of said expansible pulleys, a pair of endless belts each running over a different expansion pulley and its co-operatively aligned other pulley, and means for shifting said movable members to alternatively bring said expansible pulleys into frictional driving engagement with their respective belts, said means for shifting said movable members including a rock shaft, a shifter fork on said rock shaft and operatively associated with said movable members, a crank, a worm gear connection between said crank and said primary shaft, and a pitman arm pivoted at one end to said crank and adjacent its other end to said shifter fork.

3. A power transmission mechanism comprising a primary shaft, bearings journalling said shaft, an expansion pulley on said shaft, a countershaft journaled in spaced relation to said primary shaft, intermeshing reversing gears on said shafts, an expansion pulley on said countershaft, a power transmission pulley journalled in spaced relation to said primary shaft and co-operatively aligned with the expansion pulley thereon, a second power transmission pulley journalled in spaced relation to said countershafts and co-operatively aligned with the expansion pulley thereon, and a pair of endless belts each running over a different expansion pulley and its co-operatively aligned power transmission pulley.

4. A power transmission mechanism comprising a primary shaft, bearings journalling said shaft, an expansion pulley on said shaft, a countershaft journalled in spaced relation to said primary shaft, intermeshing reversing gears on said shafts, an expansion pulley on said countershaft, a power take-off shaft journalled in spaced relation to said primary shaft and said countershaft, a pair of pulleys rigid on said power take-off shaft and each co-operatively aligned with a different of said expansion pulleys, and endless belts each running over an expansion pulley and a co-operatively aligned pulley on said power take-off shaft.

5. A power transmission mechanism comprising a primary shaft, bearings journalling said shaft, an expansion pulley on said shaft, a countershaft journalled in spaced relation to said primary shaft, intermeshing reversing gears on said shafts, an expansion pulley on said countershaft, a power transmission pulley journalled in spaced relation to said primary shaft and co-operatively aligned with the expansion pulley thereon, a second power transmission pulley journalled in spaced relation to said countershaft and co-operatively aligned with the expansion pulley thereon, a pair of endless belts each running over a different expansion pulley and its co-operatively aligned power transmission pulley, and means for manipulating said expansion pulleys to selectively and singularly bring the same into frictional driving engagement with their respective belts.

6. A power transmission mechanism comprising a primary shaft, bearings journalling said shaft, an expansion pulley on said primary shaft, a countershaft journalled in spaced parallel relation to said primary shaft, intermeshing reversing gears on said shafts, an expansion pulley on said countershaft, said expansion pulleys being disposed in axially spaced radially overlapping arrangement one with respect to the other thereof, a power take-off shaft journalled in spaced relation to said primary shaft and said countershaft, a pair of pulleys rigid on said power take-off shaft and each co-operatively aligned with a different of said expansion pulleys, endless belts each running over an expansion pulley and a co-operatively aligned pulley on said power take-off shaft, and means engageable with the radially overlapping portions of said expansion pulleys for manipulation thereof whereby to alternately bring the same into frictional driving engagement with their respective belts.

7. A power transmission mechanism comprising a primary shaft, bearings journalling said shaft, a countershaft journalled in spaced parallel relation to said primary shaft, intermeshing reversing gears on said shafts, a pair of expansible pulleys mounted one each on said shafts and each having a fixed member and an axially movable member, said pulleys being disposed in axially spaced radially overlapping arrangement one with respect to the other thereof and having the movable member of one thereof in opposing relation to the movable member of the other thereof, a power take-off shaft journalled in spaced relation to said primary shaft and said countershaft, a pair of pulleys rigid on said power take-off shaft and each co-operatively aligned with a different of said expansible pulleys, endless belts each running over an expansible pulley and a co-operatively aligned pulley on said power take-off shaft, and shifter means interposed between the overlapping portions of said movable members for selectively and singularly moving the same into frictional driving engagement with their respective belts.

8. A power transmission mechanism comprising a primary shaft, bearings journalling said shaft, a countershaft journalled in spaced parallel relation to said primary shaft, intermeshing reversing gears on said shafts, a pair of expansible pulleys mounted one each on said shafts and each having a fixed member and an axially movable member, said pulleys being disposed in axially spaced radially overlapping arrangement one with respect to the other thereof and having a movable member of one thereof in opposing relation to the movable member of the other thereof, a power take-off shaft journalled in spaced relation to said primary shaft and said countershaft, a pair of pulleys rigid on said power take-off shaft and each co-operatively aligned with a different of said expansible pulleys, endless belts each running over an expansible pulley and a co-operatively aligned pulley on said power take-off shaft, and shifter means interposed between the overlapping portions of said movable members for alternately moving the same into frictional driving engagement with their respective belts.

9. The structure defined in claim 8 in which the means for shifting said movable members includes a rock shaft, a shifter fork on said rock shaft and operatively associated with said movable members, a crank, worm gear connections between said crank and said primary shaft, and a pitman arm pivoted at one end to said crank and adjacent its other end to said shifter fork.

10. The structure defined in claim 2 in which said relatively fixed members and said axially movable members having opposed outwardly diverging sloping belt-engaging surfaces adjacent the peripheral portions thereof and other opposed outwardly diverging sloping surfaces radially inwardly of said first-mentioned surfaces, the outer sloping surface on each member being angularly disposed with respect to the surface radially inwardly thereof and at a greater angle.

11. The structure defined in claim 7 in which said relatively fixed members and said axially movable members have opposed sloping belt-engaging surfaces adjacent the peripheral portions thereof and other opposed sloping surfaces radially inwardly of said first-mentioned surfaces, the outer sloping surface on each member being angularly disposed with respect to the surface radially inwardly thereof.

12. A device as set forth in claim 2 including a yieldable cushioning connection between the shifter fork and the pitman.

13. A device as set forth in claim 2 wherein the connection between the shifter fork and the pitman comprises a pitman guide member carried by the shifter fork and through which the pitman extends and moves, coiled springs surrounding the pitman on opposite sides of the guide member, adjustable members mounted on the pitman, said adjustable members forming means for varying the tension of the springs, said springs being interposed between the pitman guide member and the adjustable members.

14. A device as set forth in claim 2 including means for holding the crank end of the pitman in a fixed position, said means being positioned whereby either expansion pulley can be continuously held in driving engagement with its respective belt for a continuous driving in one direction.

GEORGE H. AMONSEN.

REFERENCES CITED

The following references are of record in the file of this patent:

UNITED STATES PATENTS

| Number | Name | Date |
|---|---|---|
| 804,980 | Reiss | Nov. 21, 1905 |
| 2,097,559 | Brownlee | Nov. 2, 1937 |
| 2,175,830 | Davis | Oct. 10, 1939 |